March 22, 1966 J. J. HINDERER 3,241,444
TORSIONAL LIGHT MODULATING MECHANISM
Filed Nov. 7, 1962
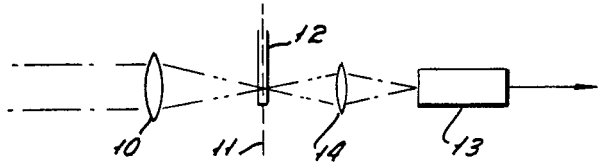
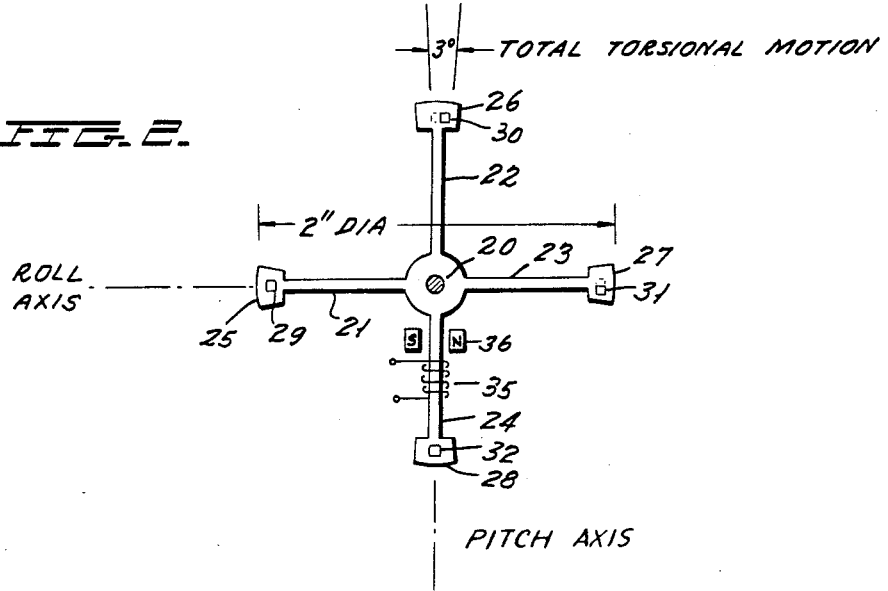
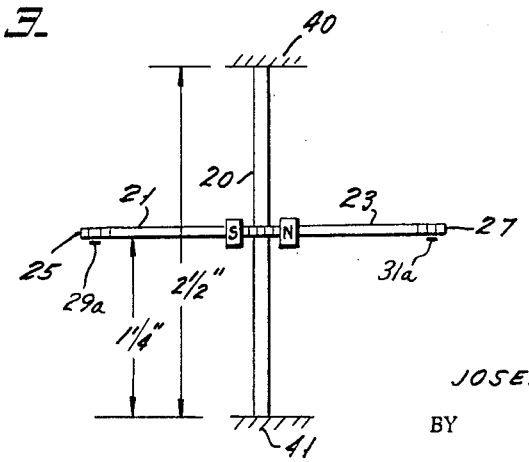
INVENTOR.
JOSEPH JOHN HINDERER
BY
OSTROLENK, FABER, GERB & SOFFEN
ATTORNEYS

United States Patent Office 3,241,444
Patented Mar. 22, 1966

3,241,444
TORSIONAL LIGHT MODULATING MECHANISM
Joseph John Hinderer, Rego Park, N.Y., assignor to Kollsman Instrument Corporation, Elmhurst, N.Y., a corporation of New York
Filed Nov. 7, 1962, Ser. No. 236,064
4 Claims. (Cl. 88—61)

This invention relates to radiation tracking devices, and more specifically relates to a scanning mechanism which causes an aperture to scan with respect to the image of an object being tracked.

Scanning systems of the type to which the invention is directed are widely used in the art, and are described, for example, in copending application Serial No. 47,837, filed Aug. 5, 1960, in the name of Jacob S. Zuckerbraun, entitled Light Modulation System and assigned to the assignee of the present invention.

In the past, the aperture which modulates the light beam being tracked has been carried either on one tine of a tuning fork, or at the end of an oscillating reed.

The principle of the present invention is to provide a novel oscillatable torsion bar for carrying scanning apertures. A permanent magnet and field coil arrangement secured to extensions of the torsion bar may then cause the torsion bar to oscillate about its axis at a frequency close to, or exactly at, the self-resonant frequency of the torsion bar. With such a novel arrangement, it is possible to provide a plurality of perpendicularly extending aperture carrying members which permit the simultaneous scanning for a plurality of photodetectors.

Accordingly, a primary object of this invention is to provide a novel scanning mechanism for star tracking equipment.

Another object of this invention is to provide a novel support for the apertures of a star tracking system wherein a plurality of apertures may be carried from a common member.

A further object of this invention is to provide a novel torsion bar support structure for the scanning apertures of a light tracking system.

These and other objects of this invention will become apparent from the following description when taken in connection with the drawings, in which:

FIGURE 1 schematically illustrates a light tracking system.

FIGURE 2 is a top view of the torsion bar support structure formed in accordance with the invention.

FIGURE 3 is a side plan view of the torsion bar structure of FIGURE 2.

Referring first to FIGURE 1, I have illustrated schematically therein a typical light tracking system which includes an objective lens system 10 which focuses the image of a remote radiant body in a plane 11 which includes a scanning mechanism 12. The scanning mechanism 12 modulates the image appearing in plane 11 in some predetermined manner with the modulated light being focused on a photosensitive device 13 by means of a lens system 14.

The output of photosensitive system 13 will contain positional information which correlates the optical axis of the objective system 10 with respect to the object being tracked. A typical scanning mechanism which could be used for scanning system 12 includes a plate which has an aperture therein which is oscillated with respect to the image of the light source being tracked. As is well known to those skilled in the art, if the image is directly at a "null" position or on the optical axis of the lens system, it will deliver a double frequency component of light to the photosensor 13 with respect to the frequency at which the aperture is oscillated. If, however, the image of the light source being tracked is off to one side or the other of the optical axis of the system, the scanning device 12 will cause the light applied to photosensor 13 to have more or less of a single frequency component which has a phase dependent upon the direction of the excursion of the image from the axis of the telescope.

The principle of this invention is to provide a novel support structure for scanning system 12 which requires relatively negligible amounts of power for oscillation thereof, and additionally permits the advantageous placement of a plurality of aperture-containing plates for scanning simultaneously along two axes.

The novel support structure of the invention is shown in FIGURES 2 and 3 in top and side views, and is essentially comprised of a torsion bar 20 which carries thereon a spider having extending legs 21, 22, 23 and 24. The torsion bar 20 may be formed of a hollow or solid bar which could be of any appropriate material such as NI-Span-C which has excellent thermal stability and good magnetic properties and has the following composition:

| | Percent |
|---|---|
| Nickel | 42.2 |
| Chromium | 5.3 |
| Titanium | 2.5 |
| Chromium and titanium | 7.6 |
| Carbon | 0.03 |
| Manganese | 0.4 |
| Silicon | 0.4 |
| Aluminum | 0.4 |
| Sulfur | 0.04 |
| Phosphorus | 0.04 |
| Iron | Bal. |

The extending spider arms 21 through 24 may be formed of a similar material, and are secured to the torsion bar 20 in any desired manner as by welding.

Plates 25, 26, 27 and 28 are then secured to the outer ends of each of arms 21 through 24 respectively where each of plates 25 through 28 have apertures 29 through 32 respectively formed therein. The apertures 29 through 32 may have all of the properties described for the apertured plate described in copending application Serial No. 47,837, filed Aug. 5, 1960, in the name of Jacob S. Zuckerbraun, entitled Light Modulation System and assigned to the assignee of the present invention.

The arm 24 then carries a field coil 35, and has a permanent magnet 36 adjacent thereto which cooperates with field coil 35. The field coil 35 is then connectable to an A.-C. source of power which, in cooperation with permanent magnet 36 which is supported independently of the oscillating system, will cause the system to oscillate.

It is to be noted that other excitation methods could be utilized such as electrostatic systems, piezoelectric systems, and the like, the magnetic system described herein being for illustrative purposes only.

The frequency at which the system is oscillated is selected to be at the self-resonant frequency of the oscillation system. By way of example, where the torsion bar 20 is a quarter inch bar having a length of 2½ inches and is rigidly mounted between an upper support 40 and lower support 41, and where the spiders 21 through 24 have a length from the center of torsion bar 20 to the end of their aperture plate of 1 inch, the total weight of the assembly is 1½ ounces, and its self-resonant frequency is 400 cycles, which is substantially equal to the excitation frequency applied to coil 35. Sufficient power is applied to coil 35 to cause an excursion from a null position of approximately 3°.

The novel construction provided by the torsion bar suspension system now permits simultaneous tracking by a plurality of photosensitive devices which are positioned in registry with apertures 29 through 32 respectively. By way of example, the apertures 29 and 31 can be in registry with two respective photoelectric systems, schematically indicated as bolometers 29a and 31a respectivley in FIGURE 3, to measure the excursion of a tracking telescope with respect to the roll-axis of the device which carries the tracking system. The apertures 30 and 32 may be associated with two further respective photosensitive devices to monitor the deviation of the vehicle carrying the scanning system with respect to a pitch-axis.

If desired, the apertures 29 through 32 could be adjustably located in their respective mounting plates 25 through 28 respectively to permit relative shifts in the aperture openings with respect to the location of their respective photosensors to thereby provide electrically phase shifted outputs for improved signal processing.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

What is claimed is:

1. A scanning mechanism for a radiation tracking device comprising a torsion bar secured at its upper and lower ends, a plurality of extending arms extending radially outwardly from said torsion bar, a respective aperture plate carried at the outer ends of each of said extending arms and an oscillation means operatively connected to said torsion bar to cause said torsion bar to oscillate through an excursion of the order of 6° at a frequency substantially equal to the self-resonant frequency of said torsion bar.

2. A scanning mechanism for a radiation tracking device comprising a torsion bar secured at its upper and lower ends, a plurality of extending arms extending radially outwardly from said torsion bar, a respective aperture plate carried at the outer ends of each of said extending arms and an oscillation means operatively connected to said torsion bar to cause said torsion bar to oscillate through an excursion of the order of 6° at a frequency substantially equal to the self-resonant frequency of said torsion bar; said torsion bar having a length to thickness ratio of the order of 10 to 1.

3. A scanning mechanism for a radiation tracking device comprising a torsion bar secured at its upper and lower ends, a plurality of extending arms extending radially outwardly from said torsion bar, a respective aperture plate carried at the outer ends of each of said extending arms and an oscillation means operatively connected to said torsion bar to cause said torsion bar to oscillate through an excursion of the order of 6° at a frequency substantially equal to the self-resonant frequency of said torsion bar; said plurality of radiating arms including at least four arms spaced by 90° from one another.

4. A scanning mechanism for a radiation tracking device comprising a torsion bar secured at its upper and lower ends, a plurality of extending arms extending radially outwardly from said torsion bar, a respective aperture plate carried at the outer ends of each of said extending arms and an oscillation means operatively connected to said torsion bar to cause said torsion bar to oscillate through an excursion of the order of 6° at a frequency substantially equal to the self-resonant frequency of said torsion bar; said plurality of radiating arms including at least four arms spaced by 90° from one another; said aperture plates of a first pair of arms of said four arms 180° displaced from one another being operative to provide scanning along a first axis; said second pair of arms of said four arms 180° displaced from one another providing scanning along an axis 90° removed from said first axis.

No references cited.

JEWELL H. PEDERSEN, *Primary Examiner.*